(No Model.)

G. B. TROUT.
CAR WHEEL AND AXLE.

No. 305,488. Patented Sept. 23, 1884.

Witnesses

Thomas J. Bewley

John Brannan.

Inventor

George B. Trout.

per Stephen Ustick. Atty

UNITED STATES PATENT OFFICE.

GEORGE B. TROUT, OF LEAMAN PLACE, PA., ASSIGNOR OF TWO-THIRDS TO ALMERN B. WALTER, OF PHILADELPHIA, PA., AND ARTHUR MILLER, OF MOORESTOWN, N. J.

CAR WHEEL AND AXLE.

SPECIFICATION forming part of Letters Patent No. 305,488, dated September 23, 1884.

Application filed February 21, 1884. (No model.)

*To all whom it may concern:*

Be it known that I, GEORGE B. TROUT, a citizen of the United States, residing at Leaman Place, in the county of Lancaster and State of Pennsylvania, have invented a new and useful Improvement in Car Wheels and Axles, of which the following is a specification.

I am aware of the patent of Nemeister and Amerson, dated September 23, 1879, No. 219,824, the English Patent No. 14,249 of 1852, and others in which there is a loose wheel on one end of the axle to admit of running over curves without friction.

The object of my invention is the accomplishment of the same result, and also providing for running on straight tracks without any turning of the axle in the eye of the wheel; and my invention relates to the combination of an axle having a conical projection with a wheel having an eye with a conical enlargement which is adjusted to the same with proper tightness by means of screws which pass through a disk that has a loose fit on the axle and into the inner side of the wheel, as hereinafter described.

Figure 1:
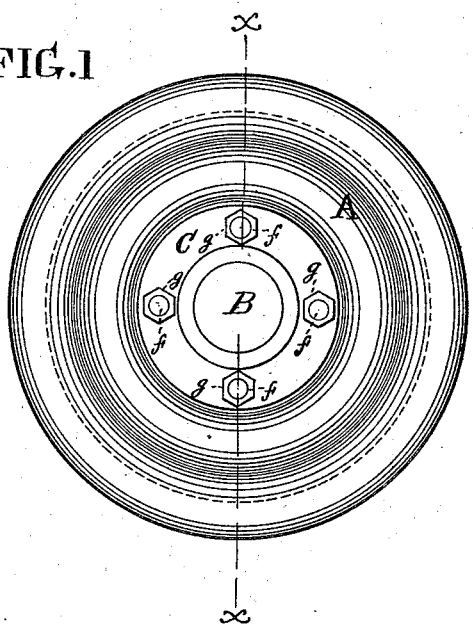
Figure 2:
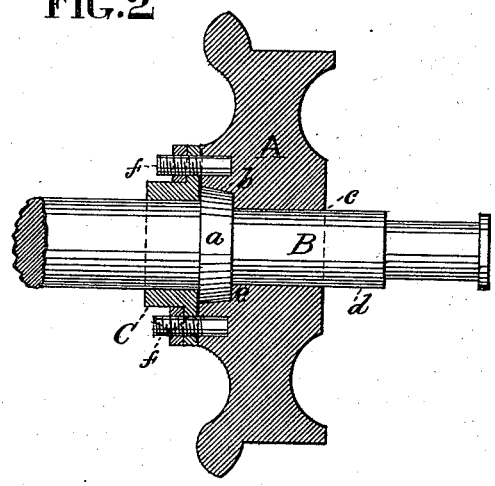
Figure 3:
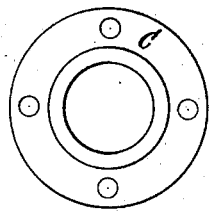
Figure 4:

In the accompanying drawings, which make a part of this specification, Figure 1 is an inner side view of the wheel A and disk C, in connection with the axle B. Fig. 2 is a sectional view of the same at the broken line $x\,x$ of Fig. 1. Figs. 3 and 4 are, respectively, a side view and sectional view of the disk C.

Like letters of reference in all the figures indicate the same parts.

A represents the partially-loose wheel on one end of the axle B, which is provided with a conical projection, $a$, that fits the conical enlargement $b$ of the eye $c$ of the wheel, the greater length of the eye fitting the straight part $d$ of the axle. The conical enlargement $b$ is of sufficient diameter to form the shoulder $e$, against which the disk C is caused to rest, and from the inner side of the wheel A pins $f\,f\,f\,f$ project, and their inner ends fit corresponding holes in said disk and have nuts $g$, by means of which the wheel is drawn inward until the conical enlargement $b$ is brought to bear upon the conical projection $a$ of the axle sufficiently tight to prevent the axle turning in the wheel while the car is running on a straight track, but not too tight to admit of a partial axial movement to compensate for the difference in the length of the outer and inner rails. As by such a combination there is no wear on the axle and eye of the wheel, except what is occasioned in running on curves, which is inconsiderable after the adjustment is once made by the regulation of the nuts $g$, further adjustment to take up the wear will not be necessary for some time.

I claim as my invention—

The combination of the disk C with the axle B, having a conical projection, $a$, provided with a shoulder, $e$, and the wheel A, having a conical enlargement, $b$, and pins $f$, provided with nuts $g$, substantially in the manner and for the purpose set forth.

GEO. B. TROUT.

Witnesses:
S. S. DOUGHERTY,
JOHN HILDEBEAD.